Oct. 8, 1968  R. D. LEY  3,405,278
HYDROELECTRIC PUMP-TURBINE APPARATUS
Filed Aug. 19, 1965
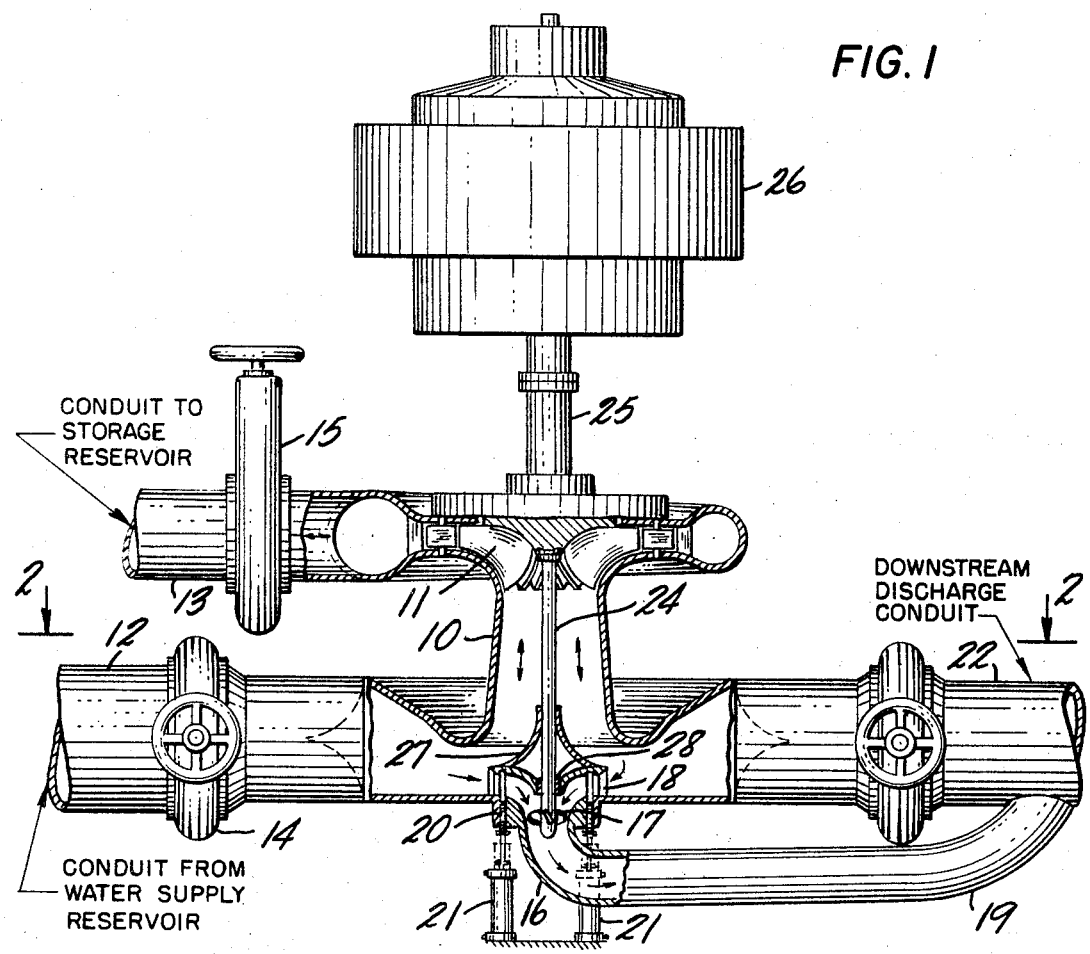
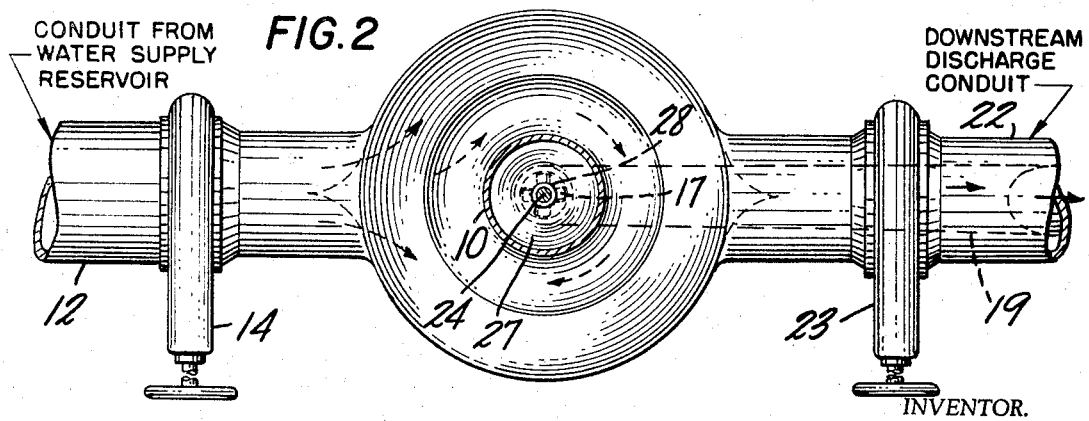
INVENTOR.
ROGER D. LEY
BY
his ATTORNEYS.

United States Patent Office

3,405,278
Patented Oct. 8, 1968

---

3,405,278
HYDROELECTRIC PUMP-TURBINE APPARATUS
Roger D. Ley, Reading, Pa., assignor to General Public
Utilities Corporation, Reading, Pa., a corporation of
New York
Filed Aug. 19, 1965, Ser. No. 480,925
10 Claims. (Cl. 290—52)

ABSTRACT OF THE DISCLOSURE

A hydraulic apparatus in which a pump-turbine is provided in a flow passage connecting a water supply reservoir with a storage reservoir at higher level and in which a tandem rotor mechanically connected to the pump-turbine is adapted to be driven by a flow of water from the water supply reservoir to a lower level to supply mechanical energy to assist the pump-turbine in its operation as a pump to lift water from the water supply reservoir to the storage reservoir.

---

This invention relates to a novel tandem booster apparatus for use in a pumped storage hydroelectric system in which energy is stored when demands for electrical power are low and the stored energy is extended when demands for electrical power are high.

Certain pumped storage hydraulic systems include a water supply reservoir, such as the water supply reservoir formed by damming a river or other watercourse, a water storage reservoir at a level higher than the water supply reservoir, and a reversible pump-turbine which acts as a pump to pump water from the water supply reservoir to the storage reservoir when demands for electrical power are low and which acts as a turbine impelled by the water released from the storage reservoir to help generate electrical power when demands for electrical power are high.

In such pumped storage hydraulic systems, the requirements for river regulation sometimes make it necessary to release water through the dam during periods when demands for electrical power are low and the water storage reservoir is not at full capacity.

The present invention provides a novel hydroelectric apparatus which makes it possible to release water from the water supply reservoir to the lower downstream level of the river and at the same time to generate energy from the water discharged downstream and utilize it to help pump water into the storage reservoir.

The novel hydroelectric apparatus of the present invention includes, inter alia, a passage connecting the water supply and storage reservoirs, a reversible pump-turbine in said connecting passage which operates as a pump when driven in one direction to pump water from the water supply reservoir to the storage reservoir and as a turbine when driven in the opposite direction to help generate electrical power, a discharge passage communicating with the lower region of said connecting passage for discharging water from the water supply reservoir to a lower level, and a turbine driven by the flow into the discharge passage and connected with the reversible motor-generator to drive the latter in the pumping direction.

For a complete understanding of the present invention, reference can be made to the detailed description which follows and to the accompanying drawings, in which:

FIGURE 1 is a schematic elevational view partly in cross-section of the novel hydroelectric apparatus of the present invention; and FIGURE 2 is a view taken along the lines 2—2 of FIGURE 1, looking in the direction of the arrows.

In the hydroelectric power plant of the present invention, a water supply reservoir is connected with a water storage reservoir at a higher level through a vertically disposed conical draft tube 10. Above the draft tube 10 there is a reversible pump-turbine which has a bladed rotor capable of rotating in one direction to pump water from the water supply reservoir upwardly through the draft tube 10 to the storage reservoir and of rotating in the opposite direction as a turbine impelled by water discharged from the storage reservoir and flowing downwardly through the tube 10.

A conduit 12 connects the water supply reservoir and the lower region of the draft tube 10, and a conduit 13 connects the storage reservoir through the reversible pump-turbine 11 with the upper region of the draft tube. The conduits 12 and 13 contain valves 14 and 15, respectively, which make it possible to shut off the flow of water through the conduits.

A conduit 22 containing a valve 23 connects the draft tube 10 with the river downstream of the dam. Water released from the storage reservoir drives the pump-turbine 11 as a turbine and can be either returned to the water supply reservoir through the conduit 12 or discharged downstream of the dam through the conduit 22. The conduit 22 is an optional part of the apparatus.

A booster turbine 17 is accommodated in the base of the draft tube 10. The housing of the booster turbine 17 has a flow passage 18 therein through which water released from the water supply reservoir into the draft tube 10 can flow to drive the bladed rotor of the booster turbine 17 when the valve 23 is closed or when the conduit 22 is omitted. The booster turbine includes a conventional elbow draft tube discharge 16 through which the water passes into a downstream discharge conduit 19 from which it is discharged to the river downstream of the dam.

The intake of water into the booster turbine 17 is controlled by a cylinder gate 20. The cylinder gate is raised and lowered by conventional turbine gate-shifting mechanism, shown schematically and for purposes of illustration only as a fluid-actuated piston and cylinder means 21. The gate 20 in its closed position prevents the discharge of water from the draft tube 10 through the booster turbine, and the gate in its open position permits the discharge of water from the draft tube 10 through the booster turbine.

The bladed rotors of the reversible pump-turbine 11 and of the booster turbine 17 are connected by a shaft 24, and both are connected by the main shaft 25 to a reversible motor-generator 26. When the reversible pump-turbine 11 is functioning as a turbine driven by water released from the storage reservoir, the reversible motor-generator 26 is driven to generate electrical power. On the other hand, when the reversible motor-generator is functioning as a motor to drive the pump-turbine 11 as a pump, the latter operates to pump water from the water supply reservoir to the storage reservoir.

The head cover for the booster turbine 17 has a conical fairing 27 mounted thereon which accommodates a bearing 28 therein for the lower end of the shaft 24. The bearing 28 can be water-lubricated, or, if the space within the head cover is maintained water-free by suitable packing at the upper end of the conical fairing, the bearing can be oil-lubricated. To keep the space within the fairing water-free, the space can be drained through one or more hollow stay vanes in the booster turbine. The outer surface of the conical fairing defines an annular flow passage connecting the conduit 12 with the upper region of the draft tube and improves the efficiency of the draft tube 10.

In the operation of the apparatus to store energy when demands are low, the gate 20 and valve 23 are closed, and electrical power is supplied to the motor-generator 26 to drive the pump-turbine 11 to pump water from the water supply reservoir to the storage reservoir. If it is also desired to discharge water downstream of the dam for purposes of river regulation or for other purposes, the gate 20 can be opened and the water in its downstream flow through the booster turbine 17 will be at the same time help drive the pump-turbine, reducing the expenditure of electrical power required to drive the motor-generator. Since the capacity of the booster turbine is less than that of the pump-turbine, only a part of the pumping energy can be transmitted through the shaft 24 from the booster turbine to the pump-turbine 11 then acting as a pump, so that the remainder of the pumping energy required must be provided through the electrical system via the generator-motor 26 acting as a motor.

In the operation of the apparatus to use the stored energy when demands are high, the gate 20 is closed, the water on the discharge side of the booster turbine is removed (e.g., by compressed air or suitable valves and drains) since the booster turbine will be operating at no load, and the water is discharged from the storage reservoir through the pump-turbine to the water supply reservoir via the conduit 12 or downstream of the dam via the conduit 22, as desired. This flow drives the pump-turbine 11 and the motor-generator 26 to generate electrical power.

The tandem booster turbine 17 not only permits water to be discharged downstream while the volume of water in the storage reservoir is being increased, but it converts into useful work the energy in the water released from the water supply reservoir, thus helping the pumping operation. Moreover, it accomplishes this objective without the use of the penstock, separate generator, controls and other facilities which would otherwise be required. Since reversible pump-turbines ordinarily require a separate starting device or special adaptations for self starting, a further but important advantage is that the tandem booster turbine serves as a means of starting the reversible pump-turbine in the pumping direction.

The invention has been shown in a single preferred form, and by way of example only, and obviously many modifications and variations can be made therein within the spirit of the invention. The invention, therefore, is not to be limited to any specified form or embodiment except insofar as such limitations are expressly set forth in the claims.

I claim:

1. A hydraulic apparatus comprising a passage connecting a water supply reservoir and a storage reservoir at a higher level than the water supply reservoir, a reversible pump-turbine rotor in said connecting passage, the reversible pump-turbine rotor operating as a pump when driven in one direction to pump water from the water supply reservoir to the storage reservoir and operating as a turbine when driven in the opposite direction to help generate electrical power, a discharge passage in direct communication with the said connecting passage for discharging water to a level lower than both reservoirs, and a turbine rotor in communication with the water flowing through said discharge passage and mechanically connected with the pump-turbine rotor.

2. A hydraulic apparatus as set forth in claim 1 including a reversible motor generator connected to the reversible pump-turbine rotor.

3. A hydraulic apparatus as set forth in claim 1 including a shaft connecting the reversible pump-turbine rotor and the turbine rotor in tandem.

4. A hydraulic apparatus as set forth in claim 1 in which the said connecting passage is a vertically disposed tube, an upper region thereof communicating with the storage reservoir and a lower region thereof communicating with the water supply reservoir, and including a vertically disposed shaft within the said tube connecting the turbine rotor and the reversible pump-turbine rotor, and gate means for opening and closing said discharge passage.

5. A hydraulic apparatus as set forth in claim 1 including an additional discharge passage communicating with the connecting passage below the reversible pump-turbine rotor for discharging water to a level lower than both reservoirs.

6. A hydraulic apparatus comprising a draft tube connecting a storage reservoir with a water supply reservoir, a reversible pump-turbine at one end of said draft tube which when driven in one direction pumps water through the draft tube from the water supply reservoir to the storage reservoir and when driven in the opposite direction impelled by water released from the storage reservoir helps generate electrical power, motor generator means connected to said reversible pump-turbine, a discharge passage in direct communication with the other end of said draft tube for discharging water to a level below both reservoirs, gate means for opening and closing said discharge passage, a booster turbine coaxial with the reversible pump-turbine and driven by the flow through said discharge passage and a shaft within the draft tube connecting the booster turbine to the reversible pump-turbine to transmit energy thereto to help drive the reversible pump-turbine as a pump.

7. A hydraulic apparatus as set forth in claim 6 including a discharge passage connecting the lower region of the draft tube through which water released from the storage reservoir can be discharged to a level below both reservoirs when the said gate means is closed.

8. A hydraulic apparatus comprising a vertical draft tube, flow passage means establishing communication between a water supply reservoir and a lower region of the draft tube, a pump-turbine including a reversible pump-turbine rotor establishing communication between a storage reservoir and an upper region of said draft tube, a booster turbine coaxial with the pump-turbine at the lower end of the draft tube and including a housing and a turbine therein, a discharge passage communicating with the extreme lower end of the vertical draft tube through said turbine housing for discharging water from the draft tube to a level below both reservoirs, a vertically disposed shaft within said vertical draft tube and connecting the reversible pump-turbine rotor and the booster turbine rotor to transmit torque from the booster turbine rotor to help drive the reversible pump-turbine rotor as a pump, conical means tapering upwardly in said draft tube to define an annular passage connecting the flow passage to the water supply reservoir and the upper region of the draft tube, an intake passage to the booster turbine, and gate means within the turbine housing for opening and closing said intake passage.

9. A hydroelectric apparatus as set forth in claim 8 including a water-free space defined within said conical means, and bearing means for the said connecting shaft within said water-free space.

10. A hydroelectric apparatus as set forth in claim 8 including flow passage means connecting the draft tube with a downstream level lower than the said reservoirs.

References Cited

UNITED STATES PATENTS

| | | | |
|---|---|---|---|
| 1,494,008 | 5/1924 | Nagler | 290—52 X |
| 1,813,107 | 7/1931 | Allner | 290—52 X |
| 3,163,118 | 12/1964 | Baumann. | |

ORIS L. RADER, *Primary Examiner.*

G. R. SIMMONS, *Assistant Examiner.*